April 17, 1934.  W. F. PIOCH  1,955,470
RADIATOR SHIELD CONSTRUCTION
Filed June 30, 1931   2 Sheets-Sheet 1
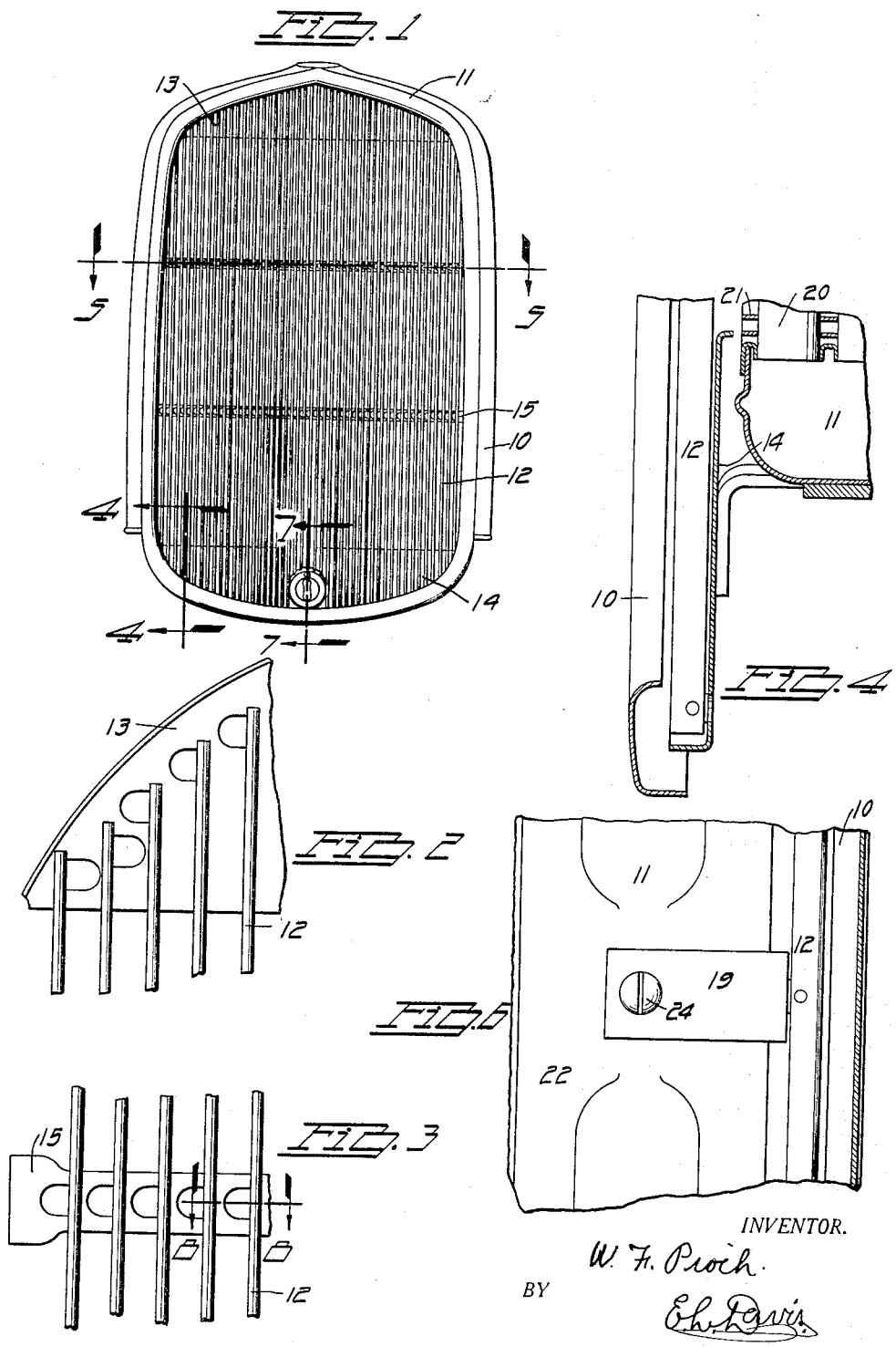

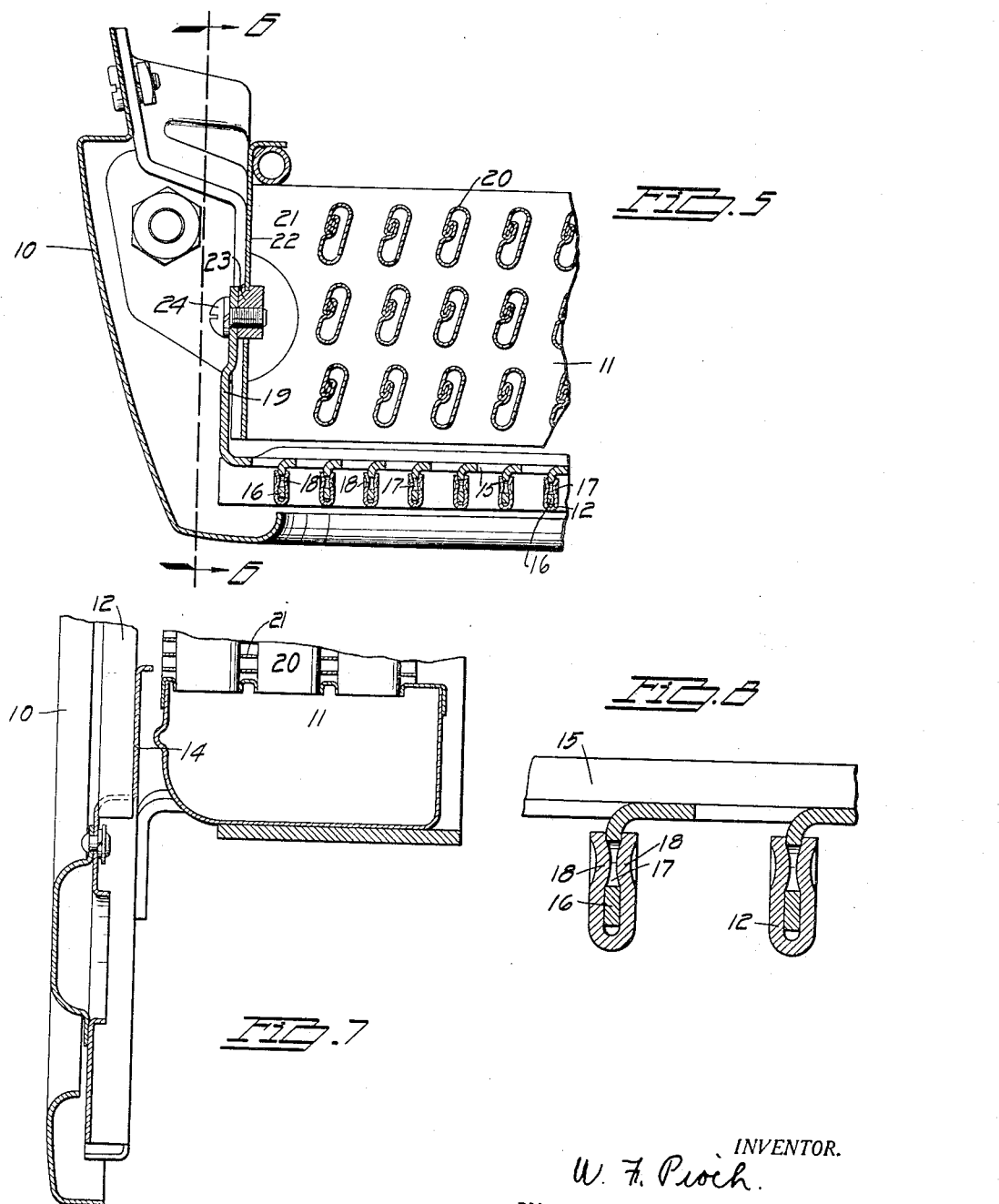

Patented Apr. 17, 1934

1,955,470

UNITED STATES PATENT OFFICE 1,955,470

RADIATOR SHIELD CONSTRUCTION

William F. Pioch, Detroit, Mich., assignor to Ford Motor Company, Dearborn, Mich., a corporation of Delaware Application June 30, 1931, Serial No. 547,953

7 Claims. (Cl. 293—54)

The object of my invention is to provide an automobile radiator shield of simple and durable construction.

A further object of my invention is to provide an automobile radiator shield which will be relatively inexpensive to manufacture for the reason that the shield is assembled in a new manner eliminating a large portion of the labor cost heretofore required for the assembly of such shields.

In the past, radiator shields have usually been constructed by corrugating a flat sheet of metal and then punching openings in the metal at the bottom of each of the corrugations thru which the incoming air is supplied to the radiator. It will readily be seen that when sufficiently large openings are provided to allow the radiator to be effectively cooled a large portion of the material of the shield must be punched away. This not only wastes the material from which the shield is made but necessitates a very difficult punching operation in order to remove the stock between the corrugations. In the construction of my improved shield no material is wasted; further, there are no difficult punching operations such as are encountered in the above mentioned structure.

In general, my radiator shield is formed from a plurality of vertical U shaped strips which are secured in a novel manner to several transverse strips which extend across the radiator, the bottom of the U strips forming the front of the shield. It is not claimed that the applicant invented such shield but only that he has invented a new means for securing the vertical strips to the transverse members which is believed to be a decided improvement over the older device wherein the vertical strips are secured to the horizontal members either by riveting or by spot welding, the riveting being unsightly while the spot welding, although forming a very satisfactory construction, required upwards of four welds for each strip. This welding accounted for a large share of the cost of the shield.

In my improved construction no riveting or spot welding of the strips is required, because I have provided a simple but very effective method whereby the strips may simply be snapped into place and be thereby firmly secured in position with only a fraction of the labor heretofore required.

Still a further object of my invention is to provide a radiator shield which is supported entirely upon the radiator core, there being no connection between the shield and the radiator shell. Thus, no rivet or welding marks need be placed in the shell so that it may be polished to a perfect finish, which finish was heretofore costly to produce, due to the rivets used to secure the shield to the shell.

With these and other objects in view, my invention consists in the arrangement, construction and combination of the various parts of my improved device, as described in the specification, claimed in my claims, and illustrated in the accompanying drawings, in which:

Figure 1 shows a front view of my improved radiator shield enclosed within a radiator shell.

Figure 2 shows a fragmentary view of one upper corner of my improved radiator shield.

Figure 3 shows a fragmentary view of the intermediate portion of my improved shield.

Figure 4 shows a sectional view taken on the line 4—4 of Figure 1.

Figure 5 shows a sectional view taken on the line 5—5 of Figure 1.

Figure 6 shows a sectional view taken on the line 6—6 of Figure 5.

Figure 7 shows a sectional view taken on the line 7—7 of Figure 1, and

Figure 8 shows an enlarged sectional view taken on the line 8—8 of Figure 3.

Referring to the accompanying drawings, I have used the reference numeral 10 to indicate generally a radiator shell which forms an ornamental enclosure for a conventional automobile radiator 11. The shell 10 consists of a highly polished band extending around the top sides of the radiator. This band is provided with a relatively narrow inturned bead on its forward edge which forms an outline for the front of the radiator. This bead is spaced a sufficient distance in front of the radiator so that my shield may be interposed between the bead and the radiator front, a sufficient space being allowed between the rear face of the shield and the front face of the radiator whereby a limited bending or deflection of the shield is permitted without coming in contact with the radiator.

My radiator shield consists of a plurality of vertically extending U shaped strips 12 equally spaced across the front of the radiator, the ends of these strips being secured to top and bottom plates 13 and 14, respectively, while the intermediate portion is secured to a pair of transverse strips 15. The vertical strips 12 are formed from a flat strip of sheet metal bent back upon its center line. These strips may be either formed singly in a punch press or may be formed by continuous rolling, whichever is more desirable for production with the machines available.

It will be seen from Figure 1 that the top and bottom plates 13 and 14 are shaped to cover the front edge of the radiator top and bottom tanks and that these plates extend underneath the bead on the radiator shell. The arcuate edges of each of these plates which are covered by this bead are each provided with a plurality of equally spaced tabs 16 punched therefrom so as to project forwardly from the radiator. These tabs are of such length that they fit in between the arms of the strips 12 and thus support the strips. It will be apparent that the intermediate portions of the strips 12 are in like manner secured to the transverse members 15, these members being also provided with a plurality of the tabs 16.

From the foregoing, it is evident that the space between the strips 12 allows free entrance of air to the radiator and, in fact, the total unobstructed area provided is considerably larger than the air passage space thru the radiator so that a minimum air restriction is offered by this shield.

A construction of great importance in connection with this device is the means whereby the strips 12 are secured to the tabs 16 without the use of rivets, screws or spot welding. I have provided each of these tabs with an opening 17 punched therethru in position spaced slightly from the base of the tab. Each of the strips 12 are provided with pairs of aligned detents 18 so distributed along the strip that each pair is aligned with the openings in each co-acting tab 16. Thus, each strip may be simply inserted over the outer end of its row of tabs, with the detents aligned with the opening 17 and with a light blow from a hammer the strips will snap into position with the detents disposed in the openings to thereby securely retain the strips on the tabs. Although I have found that great speed of assembly can be maintained by manually assembling these strips to the tabs, it may nevertheless be desirable to assemble these strips automatically, in which case a still further saving in the assembly time can be effected.

The radiator 11 is of the conventional design having a plurality of vertical tubes 20 around which are provided transverse fins 21. A pair of side plates 22 extend along the sides of the radiator in the ordinary manner, this plate forming the frame by which the radiator is secured to the vehicle. It has heretofore been customary, in providing radiator shields, to secure the shield to the inside of the radiator shell and then secure the shell around the outside of the radiator core. In my improved construction, I secure the radiator core and shell to the frame in the ordinary manner but depart from the usual construction wherein my radiator shield is secured to the radiator core and not to the radiator shell. I provide nuts 23 in the side members 22 adjacent to the ends of the strips 15. The ends of these strips are bent rearwardly at 19 and are secured to the side members 22 by means of screws 24.

The advantageous results obtainable by this structure are that the outer shell, which in this case is highly polished, need have no rivets or brackets secured thereto for holding the radiator shield in place; further, the clearance between the shield and the radiator core may be more accurately adjusted to thereby insure the structure against rattle or squeaks between the parts.

Still further advantages arise from the use of my improved device in that I have provided a novel method of securing the U shaped vertical strips to the transverse members whereby a large portion of the labor cost heretofore unavoidable is eliminated.

Some changes may be made in the arrangement, construction, and combination of the various parts of my improved device without departing from the spirit of my invention, and it is my intention to cover by my claims such changes as may reasonably be included in the scope thereof.

I claim as my invention:

1. In a radiator shield, a pair of supporting members extending along two opposite edges of the radiator, a plurality of tabs projecting forwardly from each of said members, and a plurality of U shaped strips extending between said members and straddling the tabs thereon, said strips being resiliently secured to said tabs.

2. In a radiator shield, a pair of supporting members extending along the top and bottom of the radiator, a plurality of tabs projecting forwardly from each of said members, and a plurality of vertical U shaped strips extending between said members, each strip straddling one of the tabs on each member to which it is resiliently secured.

3. In a radiator shield, a pair of supporting members extending along the top and bottom of the radiator, a plurality of tabs projecting forwardly from each of said members, each of said tabs having an opening therethru, a plurality of vertical U shaped strips extending between said members, each strip straddling one of the tabs on each member, and detents formed in said strips co-acting with said openings whereby the strips are resiliently secured to said tabs.

4. In a radiator shield, a pair of supporting members extending along the top and bottom of the radiator, a plurality of tabs projecting forwardly from each of said members, each of said tabs having an opening therethru, a plurality of vertical U shaped strips extending between said members, each strip straddling one of the tabs on each member, and pairs of aligned detents projecting inwardly from the sides of said strips co-acting with said openings whereby the strips are resiliently secured to said tabs.

5. In a radiator shield, a pair of plates extending across the front of the top and bottom tanks of the radiator, a plurality of tabs punched from said plates to project forwardly therefrom, each of said tabs having an opening therethru, a plurality of vertical U shaped strips extending between said members, each strip straddling one of the tabs on each member, and pairs of aligned detents projecting inwardly from the sides of said strips co-acting with said openings whereby the strips are resiliently secured to said tabs.

6. In a radiator shield, a radiator shell having an inwardly extending bead forming an outline for the radiator front, plates extending across the top and bottom of the radiator spaced rearwardly from said bead, said plates effectively shielding the upper and lower radiator tanks, a plurality of tabs projecting forwardly from each of said plates, each of which tabs having a transverse opening extending therethru, a plurality of vertical U shaped strips extending between said plates and straddling one tab on each plate, and inwardly extending detents formed on said strips aligned with the openings in said tabs whereby the strips may be snapped into place.

7. In a device of the character described, a radiator core, a radiator shield consisting of a plurality of transverse members extending across the radiator front, each having outwardly extending tabs formed thereon, the end of each of the reinforcing members being detachably secured to the radiator core, a plurality of vertical U shaped strips secured to said tabs, and a radiator shell secured in position around said core and shield whereby said shield will be insulated from the radiator shell.

WILLIAM F. PIOCH.